July 13, 1965 C. A. RICHIE 3,194,864
METHOD FOR PRODUCING CELLULAR THERMOPLASTIC
TUBING WITHOUT CORRUGATIONS
Filed Dec. 11, 1961

INVENTOR.
CARLTON A RICHIE
BY SPENCER L BLAYLOCK, JR.
& W.A. SCHAICH
ATTORNEYS

United States Patent Office 3,194,864
Patented July 13, 1965

3,194,864
METHOD FOR PRODUCING CELLULAR THERMO-
PLASTIC TUBING WITHOUT CORRUGATIONS
Carlton A. Richie, Toledo, Ohio, assignor to Owens-
Illinois Glass Company, a corporation of Ohio
Filed Dec. 11, 1961, Ser. No. 158,312
3 Claims. (Cl. 264—209)

This invention relates to the manufacture of cellular thermoplastic tubing and more particularly to a method by which foamable thermoplastic material may be extruded and expanded without the presence of corrugations thereon.

In the conventional method of manufacturing flattened cellular or foamable thermoplastic material, such as polystyrene, the material is extruded through the orifice of an extruder in the form of tubing. As the plastic material in its softened, viscous form leaves the orifice, the foaming agent contained therein will cause the plastic tubing to expand to form a foamed product. If the extruded thermoplastic is unconfined as it is extruded it will assume a corrugated shape in the longitudinal direction after it leaves the narrow extrusion orifice. After extrusion, air is introduced into the hot tubing to further expand it to the desired size. Thereafter it is cooled and set after which it is collapsed and collected in flat form by passing it through a pair of nip rolls.

The corrugations noted above are very difficult, if not impossible, to remove from the cooled and set tubing with the result that the finished product has longitudinal lines on its surface which are undesirable. Such corrugations result from a substantial expansion in all three direction of the foamable extruded tubing as it is released from the confines of the extruder and die. The expansion in the longitudinal direction may be accommodated and rendered substantially uniform by a change in extrusion or take-up speed. The expansion in the second direction merely results in a greater wall thickness of the extruded tubing. Expansion in the third direction is partially accommodated by inflating the tube, which is closed at one end by the nip rolls and at the other end by the extrusion orifice, with a predetermined amount of fluid pressure. However, even with the expansion of the closed tube by the fluid pressure, the foaming of the thermoplastic material is so great as to produce corrugations in such tubing. These corrugations are particularly evident when foamed polystyrene is used and the material is at a temperature in excess of 250° F.

It is therefore an object of this invention to provide a method by which cellular thermoplastic tubing may be produced without the objectionable corrugations.

Another object of this invention is to provide a method wherein cellular polystyrene material may be extruded in tubular form without the resultant corrugations as heretofore noted.

These and other objects and advantages of this invention will become apparent to those skilled in the art from the following detailed description taken in conjunction with the annexed sheet of drawings on which, by way of preferred example only, is illustrated a preferred embodiment of this invention, wherein.

In brief, my invention embodies the process of directing a diffused gaseous medium around the periphery of the extruded tube at a controlled distance from the point of extrusion.

Figure 1:
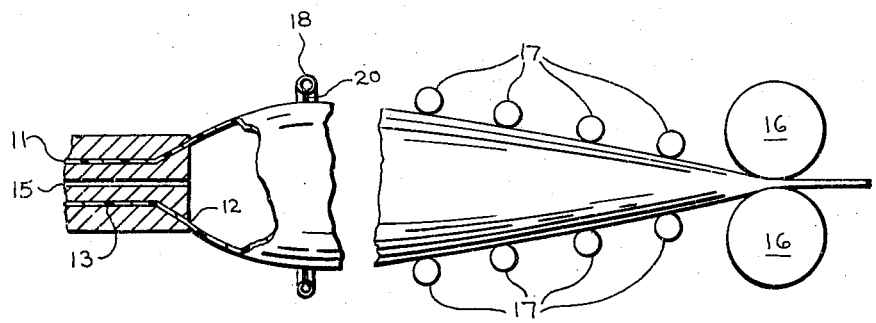
FIG. 1 is an elevational view partly in section of an apparatus for carrying out the method of this invention, showing a length of tubing extruded from an extrusion head and passing to a point where it is collapsed between a pair of nip rolls.
Figure 2:
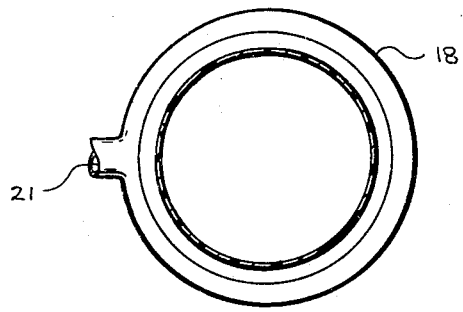
FIG. 2 is a sectional view taken through the expanded tubing showing the cooling manifold surrounding said tubing.
Figure 3:
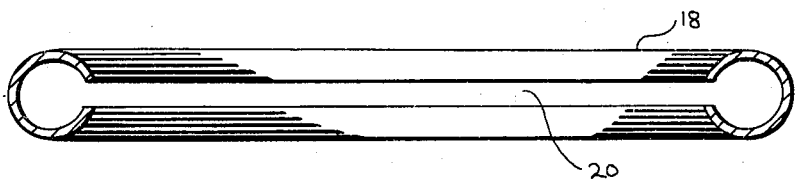
FIG. 3 is a sectional view of one type of cooling manifold showing a split ring through which the cooling air passes.

In FIG. 1 there is shown an extrusion head 10 having an annular passageway 11 terminating in an annular orifice 12 through which heated foamable thermoplastic material 13 issues in the form of tubing 14. The extrusion head 10 has a central passageway 15, which is connected to a supply of fluid pressure (not shown), through which fluid, for example air, is introduced interiorly of the tube to inflate the same. A pair of nip rolls 16, located along the longitudinal axis of the extruded tubing 14 and substantially removed from extrusion head 10, are provided to flatten tubing 14. Immediately adjacent to nip rolls 16 are a series of collapsing rolls 17 which gradually change the cross-sectional shape of tubing 14 from circular to elliptical, with increasing eccentricity, until the collapsed tubing 14 is flattened by nip rolls 16. Thus the inflated tubing 14 is drawn longitudinally from the extrusion head 10 by nip rolls 16. After tubing 14 is flattened by rolls 16 it is collected on other rolls not shown. The above equipment is of conventional construction and requires no further description or illustration.

In the foregoing method of producing the extruded tubing wherein foamable thermoplastic material is used, difficulty is encountered by the thermoplastic material, immediately upon extrusion, undergoing a three-way expansion. As previously noted, it is this expansion which produces the undesirable corrugations in tubing 14.

It has been discovered that these corrugations can be eliminated by selectively cooling the outside surface of the extruded tubing. Such selective cooling causes maximum expansion of the extruded tubing to occur substantially closed to the extrusion head than in the conventional method and serves to eliminate the corrugations. In the conventional method, the maximum expansion of the tubular formation occurs substantially distant from the point of extrusion. By the time the extruded thermoplastic material reaches this point of maximum expansion it has cooled and set to such a degree as to preclude removing the corrugations which were introduced immediately upon extrusion. In other words, although the final setting of the thermoplastic material occurs at the point of maximum expansion, the thermoplastic material has earlier become preset to such a degree as to preclude removal of the objectionable corrugations even though the tubing continues to expand. The problem then is to provide a method of controlling the location of maximum expansion so that such maximum expansion occurs before the thermoplastic material becomes preset, as expansion before such presetting will remove the corrugation. This invention provides a method by which the point of maximum expansion occurs at an optimum distance from the point of extrusion.

In accordance with this invention, a manifold 18, connected to an air supply (not shown), is located substantially distant from the point of extrusion. Manifold 18 encircles tubing 14 and is radially spaced therefrom.

A split ring or slot 20 is provided around the inner circumference of manifold 18 facing tubing 14. Air from a supply (not shown) flows into the manifold 18 through pipe 21 and thence through slot 20 onto the surface of tubing 14 to cool and set the thermoplastic material. Because the cellular thermoplastic material becomes set by cooling with the diffused air, the point of maximum expansion will be located at such point of cooling.

The location of manifold 18 from the point of extrusion depends on the size of the extrusion orifice. In determining such location, it must be close enough to extrusion head 10 to permit removal of the corrugations by achieving maximum expansion of tubing 14 before the thermoplastic material has become preset; however, if the manifold 18 is too close to extrusion head 10, the thermoplastic material will become set before the tubing 14 has reached optimum expansion. For example, when a six-inch diameter extrusion orifice was used, the manifold was located ten to twelve inches from the point of extrusion. Although this invention is not limited to any particular dimensions or proportions, the extruded tubing 14 is generally expanded two to three times the diameter of the extrusion orifice. Thus, manifolds having a considerable variation in size can be used for any particular size orifice, depending on the amount of expansion desired. In the example previously noted, the nip rolls were located approximately seven to eight feet from the point of extrusion. When the manifold was not used the point of maximum expansion was approximately one-third the distance between the point of extrusion and the nip rolls or in this case from two to three feet from the point of extrusion. By selectively cooling the extruded tubing, the point of maximum expansion was achieved more than one foot closer to the point of extrusion than was possible without the use of such cooling. In another trial heated polystyrene was extruded through a one-and-one-half-inch diameter orifice. In this trial the manifold was located three to four inches from the point of extrusion with the same type of favorable results as previously noted.

Although the method as described provides for a slot or split ring through which the air will pass, the manifold 18 could instead be provided with a multiplicity of perforations spaced around the circumference facing tubing 14. If desired, a fine screen may be placed over the perforations or the slot to aid in diffusing the air passing therethrough. Regardless of what type of opening is provided, it is essential that the cooling air emitting from manifold 18 be diffused to such an extent that no jets of air sufficiently strong to mar the surface of the tubing 14 will be present.

In the operation of this invention, granular thermoplastic resin is introduced into the feed section of a conventional extruder. As it is forced through the extruder, the granules are compacted into a solid plastic mass. This plastic mass is worked with increasing intensity so as to transform the mass into a viscous fluid state under substantial pressure before it reaches passageway 11.

A suitable expanding medium is introduced into the plastic material either at the extruder inlet or at some point along the working chamber thereof, or it may be incorporated into the granular resin prior to introduction into the extruder. Since the plastic material is converted to a viscous fluid state and is being worked constantly with a kneading and shearing action, the expanding medium is worked into and thoroughly mixed with the plastic material.

The plastic material with the expanding medium thoroughly mixed therein is forced through passageway 11. The pressure within the extruder is sufficiently high to prevent the expanding medium from expanding the plastic material until it emerges from orifice 12. At this point the plastic is forced out of orifice 12 in the form of tubing 14. As soon as the tubing 14 emerges from orifice 12, the pressure thereon is released suddenly and the expanding medium expands the plastic material into a cellular form containing a multiplicity of minute discrete cells distributed substantially uniformly throughout the tubing.

As mentioned above, the expanding medium may be incorporated into the resin prior to introduction into the extruder. The expanding medium or foaming agent will normally be a liquid or solid at room temperature but a gas at the temperature necessary to convert the solid plastic material to a viscous fluid. It is also possible to maintain the pressure in the extruder at a point which will be sufficient to insure that the foaming agent remains in its liquid state until the plastic material leaves the orifice 12 at which time it will be converted to its gaseous state because of the high temperature and absence of pressure.

Air or other pressurized medium is introduced through central passageway 15 into tubing 14 to expand such tubing to the desired size. Expanded tubing 14 is then cooled and set by passing it through the curtain of air emitting from manifold 18. After passing through the curtain of air, the tubing 14 is progressively flattened by collapsing rolls 17 before passing into the nip of rolls 16 which complete the flattening of the tubing and pass the same to a collecting device.

Although polystyrene has been mentioned as a frequently used material for the manufacture of cellular thermoplastic, it should be expressly understood that this invention is not limited to such material as this invention will work equally well with many other types of cellular thermoplastic materials.

It can readily be seen from the above description and examples that the use of my invention will provide a finished product which is free from undesirable and unattractive corrugations which result from the methods generally used in the manufacture of such product.

It is obvious that many changes and modifications may be made in this process without departing from its spirit and scope which is to be limited only by the following claims.

I claim:

1. The method of producing flattened cellular thermoplastic material comprising the steps of extruding heated foamable thermoplastic material through an orifice in the form of tubing, expanding said tubing, cooling said expanded tubing by passing the same through a curtain of diffused gaseous medium located a distance from the point of extrusion at least equal to the diameter of said orifice but not more than three times the diameter of said orifice, and collapsing said tubing.

2. In a process of forming flattened cellular thermoplastic tubing wherein foamable thermoplastic material is extruded through an orifice in the form of tubing, a fluid medium is introduced therein to expand the same, and said expanded tubing is collapsed to form the flatttened product, the improvement comprising the step of directing a diffused gaseous medium around the periphery of said tubing at a tistance from the point of extrusion at least equal to the diameter of said orifice but not more than three times the diameter of said orifice.

3. In the method of producing flattened cellular thermoplastic material wherein heated foamable thermoplastic material is extruded through an orifice in the form of tubing and corrugations are formed on said tubing as a result of the foaming action in said thermoplastic material and wherein said tubing is subsequently expanded and collapsed, the improvement comprising the step of cooling before presetting of the corrugations in said tubing has occurred by passing the same through a curtain of diffused gaseous medium located with respect to said orifice at a distance at least equal to the diameter of said orifice but not more than three times the diameter of said orifice.

(References on following page)

References Cited by the Examiner

UNITED STATES PATENTS

| | | | |
|---|---|---|---|
| 2,770,009 | 11/56 | Rogal et al. | 18—14 |
| 2,966,700 | 1/61 | Dyer et al. | 18—57 |
| 3,094,449 | 6/63 | Sisson | 264—53 |

FOREIGN PATENTS

| | | |
|---|---|---|
| 210,728 | 10/57 | Australia. |
| 1,242,535 | 8/60 | France. |
| 854,586 | 11/60 | Great Britain. |

OTHER REFERENCES

SPE Journal "Controlled Density Polystyrene Foam Extrusion," vol. 16, No. 7, July 1960, pages 705–709.

ALEXANDER H. BRODMERKEL, *Primary Examiner.*

WILLIAM J. STEPHENSON, *Examiner.*